(12) United States Patent
Liu

(10) Patent No.: US 6,557,417 B1
(45) Date of Patent: May 6, 2003

(54) METHOD AND DEVICE FOR VOID FRACTION MEASUREMENT AND ADVERSE OUTPUT SIGNAL MITIGATION ON PRESSURE-BASE INSTRUMENTS

(75) Inventor: Tay-Jian Liu, Tao Yuan (TW)

(73) Assignee: Institute of Nuclear Energy Research, Tao Yuan (TW)

( * ) Notice: Subject to any disclaimer, the term of this patent is extended or adjusted under 35 U.S.C. 154(b) by 0 days.

(21) Appl. No.: 09/499,313

(22) Filed: Feb. 7, 2000

(30) Foreign Application Priority Data

Aug. 20, 1999 (TW) ...................................... 88114232 A

(51) Int. Cl.[7] ................................................. G01L 7/00
(52) U.S. Cl. ............................. 73/714; 73/716; 73/736; 73/749; 73/723
(58) Field of Search .......................... 73/714, 715, 716, 73/723, 753, 736, 749

(56) References Cited

U.S. PATENT DOCUMENTS 3,831,588 A * 8/1974 Rindner ...................... 600/488

OTHER PUBLICATIONS

Z. Edelman, et al., International Journal of Heat and Mass Transfer, vol. 28, No. 7, pp. 1281–1292, 1985.

T. Kagawa, et al., Proceedings of the ANS/ASME/NRC International Topical Meeting on Nuclear Reactor Thermal–Hydraulics, NUREG/CP–0014 vol. 2, 1990.

* cited by examiner

Primary Examiner—Hezron Williams
Assistant Examiner—Andre Allen
(74) Attorney, Agent, or Firm—Burns, Doane, Swecker & Mathis, LLP

(57) ABSTRACT

A method and device for void fraction measurement in a gas/liquid two-phase stratified flow system in disclosed. A couple of pressure-signal tubes are mounted to the through into the top and bottom walls of the horizontal pipeline portion of the flow system to measure the pressure differential value between the top and bottom interior position thereof. The height of liquid phase level of the stratified flow is calculated from the pressure differential value and the liquid-phase density. The void fraction is derived from the known geometric relation between the height of liquid-phase level and the cross section of the pipe. Each of the pressure-signal tubes is encased within a cylindrical cooling case to avoid flashing phenomenon from occurring within the pressure-signal tube. This method is applicable for the flow at steady or transient state under high temperature/pressure condition.

22 Claims, 5 Drawing Sheets

METHOD AND DEVICE FOR VOID FRACTION MEASUREMENT AND ADVERSE OUTPUT SIGNAL MITIGATION ON PRESSURE-BASE INSTRUMENTS

FIELD OF THE INVENTION

This invention in general relates to the void fraction measurement in gas/liquid two-phase flow system. Particularly, the invention relates to a method and a pressure-differential device to measure the void fraction of a gas/liquid two-phase stratified flow within a horizontal pipeline system. The said method and said device are applicable to flow at steady and transient states, and at high-temperature/pressure conditions.

BACKGROUND OF THE INVENTION

Void fraction is a crucial parameter in the determination of energy and momentum transfer in a two-phase flow system. In usual practice, the void fraction is defined two-dimensionally, in reference to a chosen cross section of the pipe under measurement, as the area of gas phase passing through that cross section divided by the whole cross-sectional area. At present, the instruments most often used for void fraction measurement are the expensive and complicated γ-ray and χ-ray densitometers, in which void fraction is derived from radiation attenuation of one or several γ-ray or χ-ray beams traversing through the gas/liquid two-phase flow. FIG. 6 illustrates such a densitometer commonly used in industry, which includes radiation source 60, collimators 61, two-phase flow measurement section 62, radiation shields 63, and a detector and counting system 64. This layout was first reported by Edelman et. al. in International Journal of Heat and Mass Transfer, vol. 28, no. 7, 1985, where γ-ray is applied to measure the average cross-sectional void fraction of a steady-state boiling flow within a stainless steel pipe. FIG. 7 is another example, presented by Kagawa et. al. in International Topical Meeting on Nuclear Reactor Thermal Hydraulics, NUREG/CP-0014, vol. 2, 1990, where χ-ray scanning method is applied to a high-temperature/pressure flow system to measure the distribution of cross-sectional void fractions in a horizontal pipe and the system is at transient state due to a severe leakage somewhere in the pipeline system. This is an even more complicated instrument than the γ-ray densitometer just mentioned, in that, more than those basic component parts shown in FIG. 6 the instrument has, referring to FIG. 7, a radiation scanning location-control mechanism 65 and a radiation scanning beam-control electronic system 66. The measurement accuracy of γ-ray or χ-ray densitometer depends on the degree of homogeneity of the gas/liquid two-phase flow: better homogeneity of the fluid obviously promises more reliable measurement result. However, it is well known that, the void fraction of a gas/liquid two-phase flow seldom is, if ever, homogeneously distributed. The measurement accuracy of a radiation densitometer also depends on the incident angle and location of each radiation beam, because each beam, different from the rest, is specifically attenuated by a certain wall thickness of pipe and by a certain portion of gas/liquid two-phase flow. As a rule, the farther away is a radiation beam from pipe axis, the less reliable is the measurement data. Moreover, depending on the material and thickness of pipe wall, the radiation attenuation may be so great as not to leave any useful information for the detector to resolve. For a specific example, one may consider the case of a horizontal natural circulation of a gas/liquid two-phase thermal-hydraulics system, in which the density difference between low flow rate liquid phase (e.g. water) and high flow rate gas phase (e.g. vapor) is usually so large that, under the influence of gravity, the two phases virtually separate and become two quite distinct flows, namely the upper layer gas flow and the lower layer liquid flow, thus the term flow stratification. Neither γ-ray nor χ-ray densitometer is at all suitable for such flow condition for the want of fluid homogeneity.

To overcome the aforesaid deficiencies of radiation method for void fraction measurement, the present invention, taking advantage of the fact that flow stratification phenomenon often occurs in natural circulation of gas/liquid two-phase flow within horizontal pipeline system, discloses a method to determine the void fraction of gas/liquid stratified flow; wherein a couple of pressure-signal tubes are vertically flush-mounted to the top and bottom interior surface of the horizontal pipeline to measure the pressure differential across the pipe. A thermocouple-rake temperature probe assembly is used to obtain the average temperature of the liquid phase of a gas/liquid two-phase stratified flow, in which the thermal stratification also occurs. Therefore, the average mass density of the liquid phase of the stratified flow is obtained. Then the liquid-phase level of the stratified flow is calculated from the aforesaid pressure-differential data and liquid-phase mass density data. Finally the void fraction is derived from the known geometric relation between said liquid-phase level and the cross section of the pipe.

SUMMARY OF THE INVENTION

Since commercialized instruments for void fraction measurement of gas/liquid two-phase flow, such as γ-ray or χ-ray densitometer, are far from satisfactory when flow stratification occurs, owing to the reasons briefly discussed in the foregoing, it is the principal objective of this disclosure to resolve this problem by providing a novel method for void fraction measurement, applicable to vapor/water, or any other kind of gas/liquid two-phase stratified flow within a horizontal pipeline system. According to this disclosure, a couple of pressure-signal tubes are vertically flush-mounted to the top and bottom interior surface of the pipe at a selected location, so as to measure the pressure differential across the cross section at that location; and, through liquid-phase mass density correction, this pressure-drop data is transformed into the liquid-phase level within the pipe; and the said liquid-phase level, by its geometric relation with the cross section of the pipe, is then transformed into void fraction. The device herein disclosed can accurately determine the void fraction of a horizontal gas/liquid two-phase stratified flow, be the flow at steady or transient state, and whether or not the flow is at high-temperature/pressure condition.

When the flow being measured is at high-temperature/pressure condition or is at transient state, physical effects like gravity and heat that may render pressure-differential measurement difficult must be put into consideration. Not only does gravity produce flow stratification, but it may also pull down some pressure-signal transmitting medium from the upper pressure hole, resulting in voids or even void sections present within the upper pressure-signal tube. To obviate the gravitational effect four measures are taken: (1) keep as small as possible the diameter of pressure-signal tube that is near the pressure hole, (2) keep as short as possible the vertical section of the upper pressure-signal tube that is near the pressure hole; (3) keep as small as possible the two locations at top and bottom pressure holes where pressure-signal transmitting medium is present; and (4) have pressure-signal tubes flush-mounted to the top and bottom interior surface of the pipe. As to heat, obviously it can increase the temperature of pressure-signal tubes, especially at the sections near the pressure holes, because of thermal conduction. A density gradient will therefore occur within pressure-signal transmitting medium. This problem will be especially serious at the upper vertical section of the pressure-signal tube, and will greatly affect measurement accuracy of the liquid-phase level of a gas/liquid two-phase stratified flow within a horizontal pipeline system. If accident such as leakage or cleavage occurs in a high-temperature/pressure closed system, resulting in pressure decrease faster than temperature decrease, vaporization of the liquid phase within the system may begin rapidly (this is called flashing phenomenon), and this may sometimes lead to vaporization of pressure-signal transmitting medium near the pressure holes. Flashing of pressure-signal transmitting medium may also result in voids or even void sections within pressure-signal tube. Once voids or void sections are present within the vertical section of pressure-signal tubes, any further measurement is not merely futile but, in some cases, possibly dangerous may result. This is because the measurement device is no longer reliable: it may produce false signals which may accordingly trigger the safety systems of, say, a nuclear reactor to work, or, contrariwise, it may ignore accident evolution and delay the safety systems, and neither case is exactly desirable. To mitigate the effects of thermal conduction and flashing phenomenon, this invention has each one of the pressure holes and its nearby space encased within a cylindrical coolant cladding to keep the temperature of the pressure-signal transmitting medium at safe condition. Experiments done in this laboratory prove that this local cooling strategy can effectively prevent loss of pressure-signal transmitting medium due to density gradient or vaporization. Thus, more than providing a method and a device to measure the void fraction of a gas/liquid two-phase stratified flow within a horizontal pipeline system, this invention provides a preventive method and a device to effectively overcome the problem of loss of measurement accuracy due to loss of pressure-signal transmitting medium encountered in transient flow system by the commonly used pressure-based instruments such as fluid-level meter, flowmeter, pressure-drop meter, pressure meter, etc.

BRIEF DESCRIPTION OF DRAWINGS

The invention will be better understood by reference to the following description and installation examples, in conjunction with the appended drawings, wherein.

DETAILED DESCRIPTION OF THE INVENTION

This invention provides a method and a device to measure the void fraction of a gas/liquid two-phase stratified flow within a horizontal pipeline system, with the flow at steady or transient state. Moreover, this invention provides a preventive method, making use of the device herewith disclosed, to effectively prevent loss of measurement accuracy in the reading and indicating of pressure or pressure-differential data due to flashing phenomenon which is often encountered in pressure transient flow system by several pressure-base instruments. As in the present invention, the void fraction is derived from the geometric relation between the liquid-phase level of a gas/liquid two-phase stratified flow and the cross section of the horizontal pipe being measured. How to accurately measure the liquid-phase level at variety flow conditions is of crucial concern.

As already indicated in the foregoing, three causes can affect measurement accuracy of liquid-phase level in a gas/liquid two-phase stratified flow system, (1) gravitational effect, causing loss of pressure-signal transmitting medium in the upper pressure-signal tube and resulting in voids or void sections present within pressure-signal tube, (2) thermal conduction effect, causing density gradient of pressure-signal transmitting medium within pressure signal tubes, and (3) flashing effect, causing loss of pressure-signal transmitting medium owing to vaporization and often resulting in voids or even void sections within pressure-signal tube. To obviate the gravitational effect the invention takes the following four measures: (1) keep as small as possible the diameter of pressure-signal tube that is near the pressure hole, (2) keep as short as possible the vertical section of the upper pressure-signal tube that is near the pressure hole, (3) keep as small as possible the two locations at top and bottom pressure holes where pressure-signal transmitting medium is present, and (4) have pressure-signal tubes flash-mounted to the top and bottom interior surface of the pipe. The strategy to overcome thermal conduction and flashing effects is to have the pressure holes and their nearby spaces encased by coolant claddings to keep the temperature of pressure-signal transmitting medium at safe condition.

Figure 1:
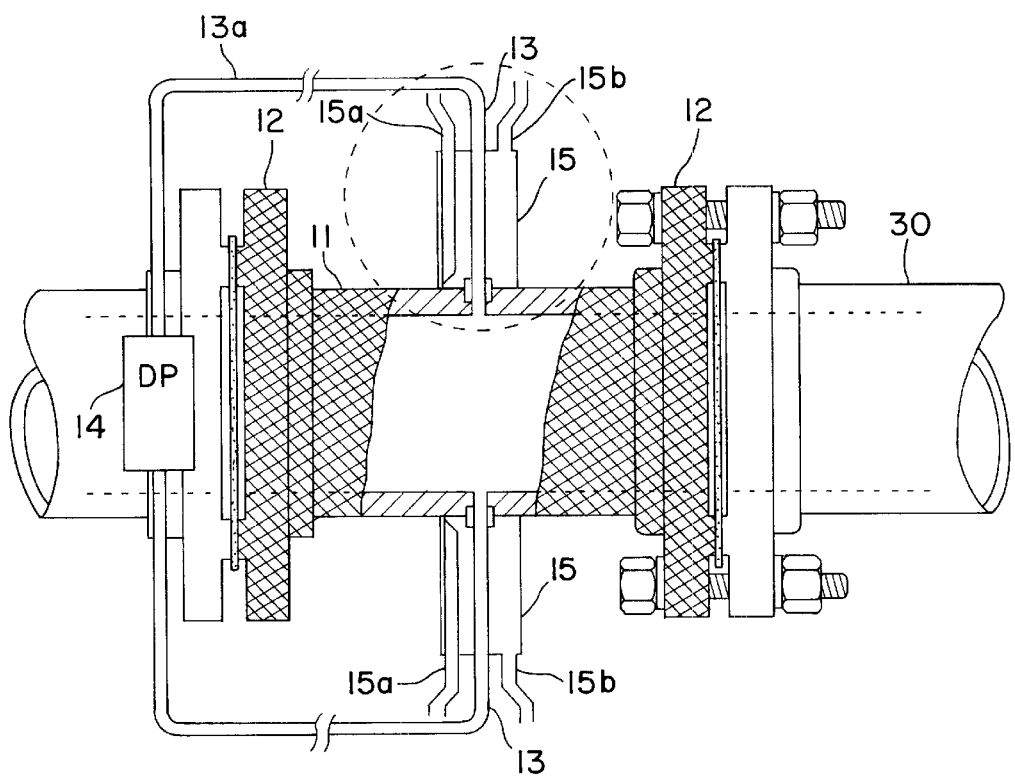
FIG. 1 is a partially sectional view of an embodiment of the in-whole model of the invention.

The measurement device disclosed by the invention has two models: the in-whole model and the in-component model. FIG. 1 is an embodiment of the in-whole model, in which there is a cylindrical primary device 11, which is of the same diameter as that of the pipeline system to be measured; at each of the two ends of said primary device 11 there is a flange 12 or any other suitable joint, which is to connect the primary device to a horizontal pipe 30. There are two pressure-signal tubes 13, with their tips vertically mounted flush to the top and bottom interior surface of the primary device 11, pressure holes being usually located at the middle of the primary device; each of the two pressure-signal tubes 13 is extended via a linking tube 13a to each side of the same pressure-differential signal output device 14, forming a loop from one pressure hole to the other one.

In order to control the temperature of pressure-signal transmitting medium that is near two pressure holes, each pressure hole and a part of the vertical section of accompanying pressure-signal tube 13 is encased by a cylindrical coolant cladding 15. In each of the two cylindrical coolant claddings 15, there is a coolant entrance tube 15a, which is, from the side of coolant cladding opposite to the wall of the primary device 11, drawn deep into the coolant cladding along the interior surface of said coolant cladding till its end barely touches the primary device, with its opening facing the pressure hole; and there is also a coolant exit tube 15b connected to the coolant cladding 15 on the side opposite to the wall of the primary device 11. Though not shown in the drawing, it is to be understood that, the upper and lower coolant entrance tubes 15a can be joined into one tube leading to a coolant supply source; and it is the same with the upper and lower coolant exit tubes 15b, to a coolant discharge tank in which the discharged warm coolant can be reused after heat dissipation in the air.

In the following, the in-whole and in-component models of the invention are distinguished and described by way of a few installation examples.

Figure 2B:
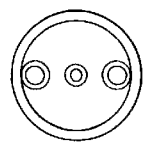
FIG. 2B is the cross-sectional view of said cylindrical coolant cladding assembly, indicating the locations of pressure-signal tube, coolant entrance tube, and coolant exit tube.
Figure 2A:
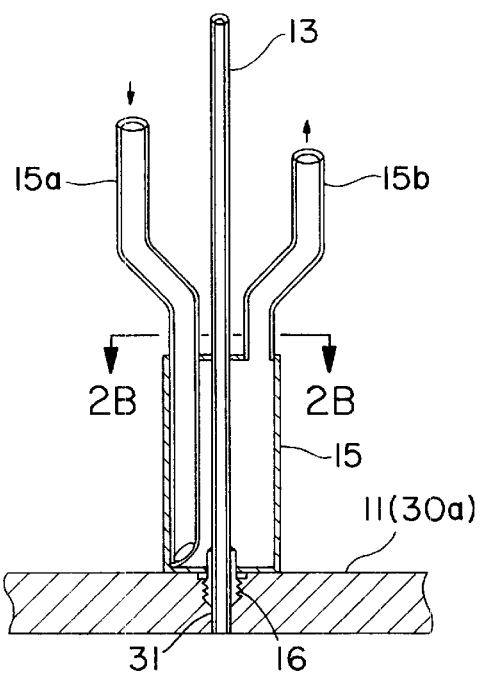
FIG. 2A is an enlarged partially sectional view of a cylindrical coolant cladding assembly as the first installation example of the in-whole model.

As the first installation example of the in-whole model, FIG. 2A is an enlarged partially sectional view of a cylindrical coolant cladding assembly; and FIG. 2B is the cross-sectional view of said cylindrical coolant cladding assembly, indicating the locations of pressure-signal tube, coolant entrance tube, and coolant exit tube. In this installation example a cylindrical coolant cladding assembly 15 is adhered to the wall of the primary device 11 by a cylindrical fixer (or connector) 16. Here pressure-signal tube 13 runs along the axis of said coolant cladding 15 and that of said fixer 16, and stops right at the interior surface of the primary device 11. The pressure-signal tube is not inserted into the primary device lest it should cause flow field disturbance. To make room for piping operation, coolant entrance and exit tubes, 15a and 15b, are so designed that outside the cylindrical coolant cladding 15 they are led away from pressure-signal tube 13 as shown in FIG. 2A.

Figure 3:
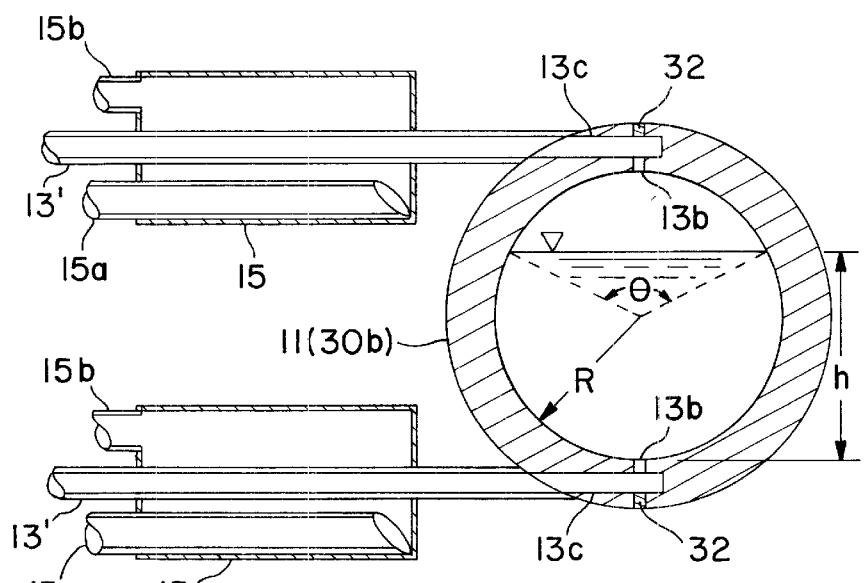
FIG. 3 is an enlarged partially cross-sectional view of an embodiment of them in-whole model as the second installation example of the invention.

As the second installation example, FIG. 3 is an enlarged partially cross-sectional view of another embodiment of the in-whole model. In previous example (FIG. 2), the pressure-signal tube 13 and cylindrical coolant cladding assembly 15 are vertically mounted flush to the top and bottom of the primary device. In the present example, the pressure-signal tube 13' is horizontally mounted flush to the top and bottom of the primary device which is horizontally positioned. Here are two vertical, narrow, round holes 13b so created that their axes coincide with the vertical diameter of the primary device 11; and two horizontal, round, deep holes 13c, each running horizontally through a portion of the wall of the primary device till crossing one of the vertical hole, as shown in FIG. 3. The diameter of the horizontal hole 13c is the same as the outer diameter of pressure-signal tube 13'. A pressure-signal tube 13' is inserted into each of the two horizontal holes 13c, and the upper and lower ones are linked to each side of the same pressure-differential signal output device (not illustrated). The cylindrical coolant cladding assemblies, including coolant claddings 15, coolant entrance tubes 15a and coolant exit tubes 15b, are also present in this installation example similar to the previous arrangement. Since the present installation effectively obviates the adverse effect of gravitational force on pressure-signal transmitting medium within pressure-signal tubes 13', the cylindrical coolant claddings 15 need not be adhered to the wall of the primary device 11 the same way described in the previous example. The purpose of applying a cylindrical coolant cladding to each horizontal pressure-signal tube 13' in a way as shown in FIG. 3 is to prevent loss of measurement accuracy owing to flashing phenomenon or to the temperature gradient of pressure-signal transmitting medium that is found to be produced from a thermal flow by thermal conduction. To make sure that pressure-signal tube is steadfastly encased within coolant cladding, it is better, of course, to have a portion of the coolant cladding 15 tightly fixed onto the wall of the primary device 11. In the present installation example, pressure signal tubes 13' are horizontally attached to the primary device from the same side of said primary device; however, it is possible to have them one at the left-hand and the other at the right-hand side of the primary device, depending on how the two horizontal holes 13c may be most conveniently made without interfering the pipeline system.

In foregoing two installation examples, the pressure-signal tubes 13 (or 13') and cylindrical coolant cladding assemblies 15 are mounted to a cylindrical primary device 11 having flanges 12 at its two ends to make an in-whole model of the present invention, so that the whole device is placed within the pipeline system for measurement via flange joints. As to the in-component model, this means two pressure holes are vertically drilled into the pipe wall, one from the top and another from the bottom of a chosen location of horizontal pipeline system, and then the pressure signal tubes and cylindrical coolant cladding assemblies are directly mounted to the pipe, without the use of cylindrical primary device and flanges. Therefore, as in the third installation example, the pressure-signal tubes and cylindrical coolant cladding assemblies shown in FIG. 1 and FIG. 2 are an in-component model of this invention; and another in-component model is illustrated in FIG. 3 as well, which is the forth installation example of the invention, with the understanding that the vertical and horizontal pressure holes are directly drilled into the pipe wall.

In the third installation example the measurement device consists of pressure-signal tubes 13 and cylindrical coolant cladding assemblies 15, 15a and 15b. This example can be understood by referring to FIG. 2, in which the primary device 11 is disregarded, instead of which 30a represents a portion of the horizontal pipeline system under measurement. In this example, two vertical pressure holes 31 are so created that their axes coincide with the vertical diameter of pipe at a chosen location for measurement, one being drilled through the wall from the top of pipe and another from the bottom. Then fixers (or connectors) 16, pressure-signal tubes 13, and coolant claddings 15 are one by one put in place, followed by coolant entrance and exit tubes, 15a and 15b, and the installation done.

Likewise, the fourth installation example can be described with the help of FIG. 3. Here 30b represents the chosen location of the horizontal pipeline system for measurement. The component parts are installed according to the following procedures. In the first place, two vertical, narrow, round holes 13b are drilled through the pipe wall at the chosen location, one being from the top, another from the bottom, of the horizontal pipe, with their axes coinciding with the vertical diameter of pipe at that location. Then, aiming at the center of one small hole 13b, a round, deep hole 13c, with a diameter the same as the outer diameter of pressure-signal tube and with its axis on the cross-sectional plane of the pipe at that location, is horizontally drilled into the pipe wall, till it runs through the small hole 13b and a little further, as shown in FIG. 3. This work is repeated to create another 13c with respect to another 13b. The outer end of each vertical small hole 13b is then stopped up with a plug 32 or by the method of spot welding, or any other suitable means. The pressure-signal tubes 13', cylindrical coolant claddings 15, coolant entrance tubes 15a, and coolant exit tubes 15b are one by one put in place and the installation is done. In this installation example, the pressure-signal tube 13' is simply inserted into horizontal hole 13c. However, it is possible to use a fixer or a connector (not illustrated in FIG. 3) to tightly hold the two together.

Having described the void fraction measurement device of the invention by a way of four installation examples, the method for void fraction measurement applicable to gas/liquid two-phase stratified flow, either at steady or transient state, in horizontal pipeline system, is discussed as follows.

The measurement method of the invention includes the following five steps: (1) select a proper location of horizontal pipeline system where measurement needs to be and/or can be conveniently done, (2) have the measurement device installed at a selected location, (3) with the upper and lower pressure-signal tubes measure the pressure differential when the flow within the pipe becomes a gas/liquid two-phase stratified flow, (4) derive the liquid-phase level within the pipe from the pressure-differential data along with liquid-phase mass density correction, (5) derive void fraction from the geometric relation between the liquid-phase level and the cross section of the pipe.

Figure 4B:
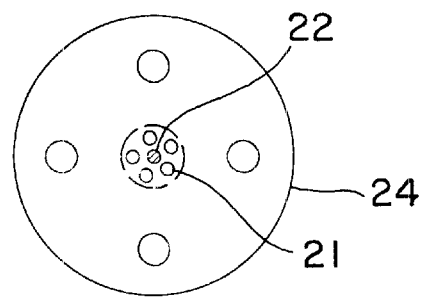
FIG. 4B is a cross-sectional view (at the elevation of temperature probe holder) of the thermocouple-rake temperature probe assembly shown in FIG. 4A.
Figure 4A:
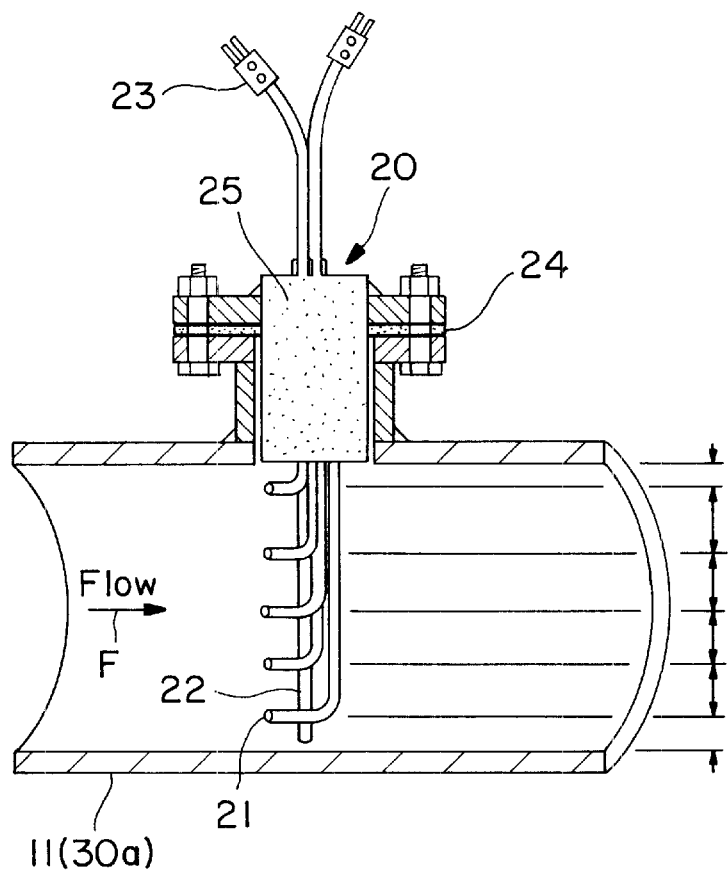
FIG. 4A is a sectional view of a thermocouple-rake temperature probe assembly, suitable for measuring the average temperature of the liquid phase of a gas/liquid two-phase stratified flow in which thermal stratification also occurs.

To obtain an accurate data of the liquid-phase level of a gas/liquid two-phase stratified flow, the liquid-phase mass density correction must be put into consideration. This comes usually from the measurement of liquid-phase temperature. In the present invention a thermometer 20, which is called a thermocouple-rake temperature probe, is inserted into the pipe a little distance downstream from the pressure-differential measurement location to measure the average temperature of the liquid phase of stratified flow. For the reason that in a gas/liquid two-phase stratified flow thermal stratification may also occur, this phenomenon being often found in the liquid phase of a natural circulation low-velocity thermal flow, resulting in density gradient within liquid phase, it is important to use a thermometer capable of measuring the temperature of liquid phase from many locations and at various levels of the flow. FIG. 4A is a sectional view of a thermocouple-rake temperature probe assembly which is suitable for measuring the average temperature of liquid phase of a stratified flow in which thermal stratification is also present, and FIG. 4B is a cross-sectional view (at the elevation of temperature probe holder 24) of the said thermocouple-rake temperature probe assembly; wherein 21 represents a thermocouple-rake tube, 22 is a steel rod which fastens each rake tube against the force of flowing stream, 23 is a thermocouple output plug which carries the temperature information from each thermocouple-rake tube, 24 is a temperature probe holder which fixes the temperature probe at a chosen location of the pipe wall, and 25 is a gasket or any suitable sealing material. This thermometer design is to evaluate the average temperature of liquid phase, therefore the average liquid-phase mass density, of the flowing stream by a few thermocouple-rake tubes which are equally distributed along a steel rod inserted within the flow field with their tips turning toward the flow direction in the form of a rake. Of course, any other conventional temperature probe that can achieve the objective may be also used in place of the thermocouple-rake temperature probe assembly herein introduced.

Now, the void fraction of a gas/liquid two-phase high-temperature/pressure stratified flow, whether at steady or transient state, within a horizontal pipeline is expressed by the following equation:

$$\alpha = (2\pi - \theta + \sin\theta)/2\pi$$

in which $\alpha$ represents void fraction and $\theta$ is the radial angle of liquid-phase level within the pipe. Referring to FIG. 3, let the inner radius of the pipe denoted by R, and the liquid-phase level by h, then $$\theta = 2\cos^{-1}[(R-h)/R]$$

The liquid-phase level h can be expressed as $$h = DP/\rho g,$$

where DP is the pressure differential, measured vertically across the horizontal pipe through its center, $\rho$ is the average mass density of the liquid flow, which can be derived from the average temperature of liquid flow, and g is gravitation constant.

In the application of the device of the invention, the pressure-signal transmitting medium within pressure-signal tubes need not be the same as the flowing stream; and, especially, the device is suitable for thermal flow system, besides usual calibration, i.e. the normal-temperature/pressure condition. In the application of the device of the invention to a high-temperature/pressure vapor/water two-phase flow system commonly found in industry, the usual tap water at normal-temperature low-velocity condition can be used as coolant in the measurement device. However, it is understood that, other than water, any cooling fluids if found suitable can be adopted as well. Sometimes it may be desired to obtain void fraction data at a few interesting or important locations along the pipeline system. In such case it is advisable, for the sakes of simplicity and economy, to have the coolant exit tube 15b of one location linked to the coolant entrance tube 15a of the next location downstream, so that the coolant is as many times used as the number of measurement locations before the coolant is led to the discharge tank. The cooling arrangement of this invention is not limited by the foregoing description of four installation examples; any other cooling apparatus in any other way of installation that does not depart from the spirit of the invention may be used, so long as they achieve the cooling objective.

Moreover, this invention provides a preventive method to effectively prevent the adverse output signals due to flashing phenomenon often encountered in transient flow system by several pressure-base instruments, such as fluid-level meter, flowmeter, pressure-differential meter and pressure meter, etc, which use pressure or pressure-differential as their original signal and are widely used in industry. This preventive objective is achieved by installing the cylindrical coolant cladding assemblies (15, 15a, 15b) onto the pressure holes and pressure-signal tubes of the conventional pressure-base instruments to control the temperature thereabouts, so as to mitigate the adverse effect on pressure-signal transmitting medium caused by flow at high-temperature/pressure and/or transient condition. In such application of the invention the pipeline system being measured need not be in horizontal position, depending only on how the pressure-base instrument in use is positioned.

The following safety-concern experiment may very well demonstrate how the invention can be applied to a nuclear power reactor. This is a simulation of a loss-of-coolant-flow accident, which is one of the design-basis accidents that determine acceptability in terms of potential radioactive product release, of great importance in the design and construction of a nuclear power plant.

Figure 5:
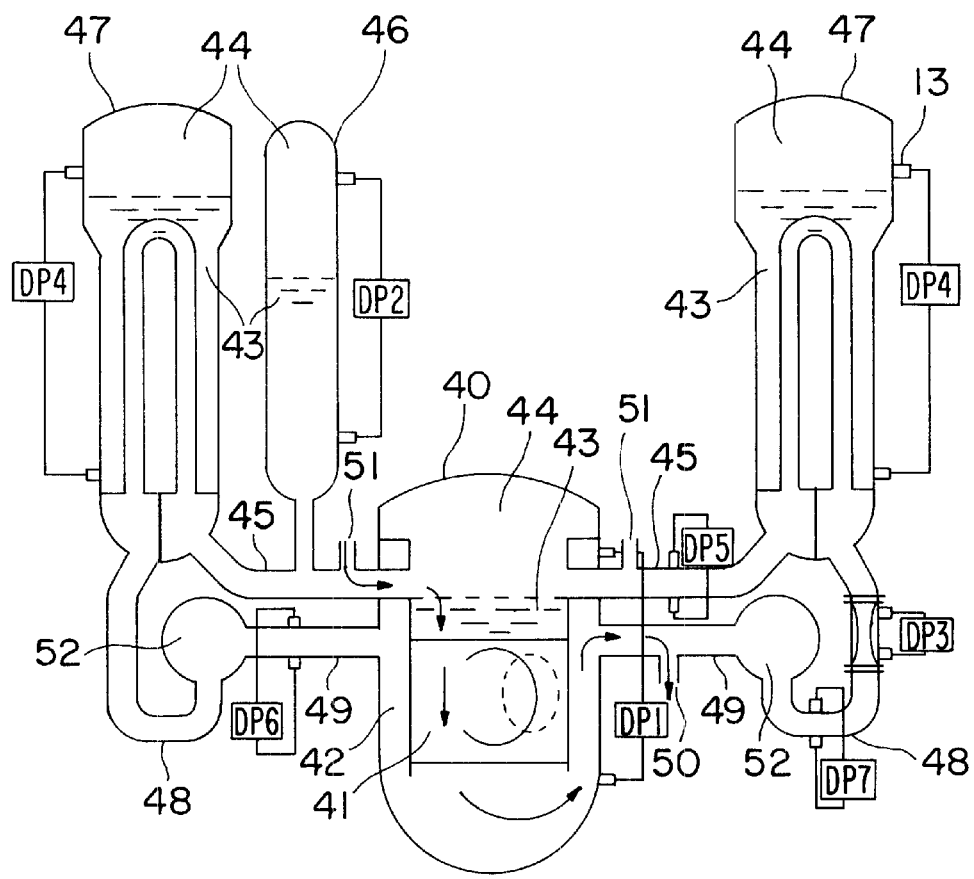
FIG. 5 is a graphical representation of a nuclear reactor test model.
Figure 6:
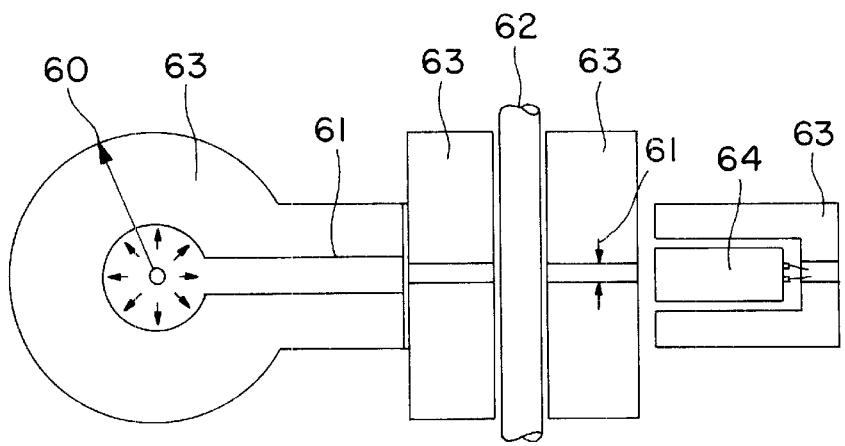
FIG. 6 is a graphical representation of a conventional γ-ray densitometer.
Figure 7:
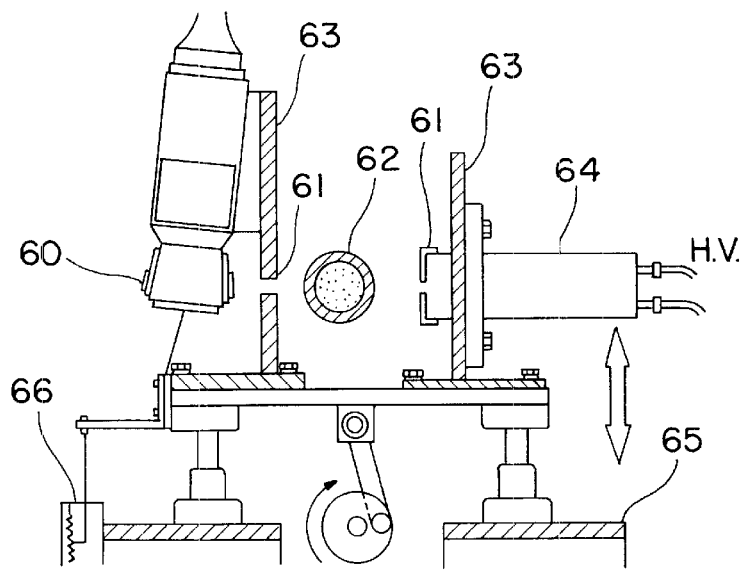
FIG. 7 is a graphical representation of a conventional χ-ray densitometer.

FIG. 5 illustrates an application of the present invention to a small-scale test model of a typical pressurized water reactor, wherein 40 is pressure vessel; 41 is core fuel region, which supports the fission chain reaction; 42 is down-comer region; 43 is cooling water region; 44 is steam region; 45 is hot leg section; 46 is pressurizer, which maintains the sensitive pressure/temperature balance in the system; 47 is steam generator, which converts fission heat energy to steam; 48 is main coolant pump inlet section; 49 is cold leg section; 50 is the location where break or leakage occurs; 51 is emergency core cooling water entrance; and 52 is main coolant pump. In this test model, a loss-of-coolant accident resulting in flashing phenomenon is simulated by a break or leakage 50 at the cold leg section 49, so as to demonstrate how the present invention, upon such a special occasion, can effectively prevent loss of accuracy on the measurements of a number of pressure-differential data which are useful in the determination of liquid-phase level, flow rate, and void fraction, etc. Seven measurement devices of the invention are used in an experiment, as shown in FIG. 5, namely: DP1 which measures the water level of the primary loop within pressure vessel 40; DP2 which measures the water level of the primary loop within pressurizer 46; DP3 which measures the flow rate within the primary loop at a vertical constriction, the said construction being similar to a Venturi meter; DP4 which measures the water level of the secondary loop within steam generator 47; DP5 which measures the void fraction in hot leg section 45; DP6 which measures the void fraction in cold leg section 49; and DP7 which measures the void fraction in main coolant pump inlet section 48.

As soon as a loss-of-coolant-flow accident occurs, the pressure within the system begins to decrease as a result of coolant loss, which automatically triggers the safety systems of the reactor to shut down the core, stop the main coolant pumps 52, let in emergency core cooling water, and take perhaps other safety measures. In the course of these emergency operations, decay-heat removal from the core is a process of thermal-flow natural circulation, of which the driving force being the density gradient within the thermal flow under the depressurization transient condition. Moreover, before the system is put back to normal function, decay heat continuously causes water flashing phenomenon and, as a consequence, the thermal flow within the horizontal sections of the system (i.e. hot leg section 45, cold leg section 49, and main coolant pump inlet section 48) becomes a vapor/water two-phase stratified flow. Obviously, therefore, the present invention finds many applications in such a test model. This simulation experiment proves that the invention can effectively prevent the loss of measurement accuracy of pressure or pressure-differential data due to gravity, thermal conduction, and flashing phenomenon, and accordingly is successful in monitoring the liquid-phase level, flow rate, and void fraction of a high-temperature/pressure gas/liquid two-phase stratified flow such as represented in a loss-of-coolant accident In comparison with specialized void fraction measurement instruments, such as γ-ray or χ-ray densitometer, which are complicated and expensive, the present invention has the following advantages: (1) better measurement accuracy (errors being estimated to be within 1.5% of the validity ranges of the measurement device), (2) lower cost (only 1/50–1/100 of the price of a radiation instrument), (3) smaller space occupation, (4) no radioactive problem, (5) easier to calibrate the instrument, (6) no need of specially trained technician to do the measurement work.

Brief explanations of the numerals in FIGS. 1, 2, and 3:

| | |
|---|---|
| 11 | cylindrical primary device |
| 12 | flange or another kind of joint |
| 13, 13' | pressure-signal tube |
| 13a | linking tube |
| 13b | vertical pressure hole |
| 13c | horizontal pressure hole |
| 14 | pressure-differential signal output device |
| 15 | cylindrical coolant cladding |
| 15a | coolant entrance tube |
| 15b | coolant exit tube |
| 16 | fixer (or connector) |
| 20 | thermometer (thermocouple-rake temperature probe assembly) |
| 21 | thermocouple-rake tube |
| 22 | steel rod (holder of thermocouple-rake tubes) |
| 23 | thermocouple output plug |
| 24 | temperature probe holder |
| 25 | gasket or any suitable sealing material |
| 30, 30a, 30b | horizontal pipeline system |
| 31 | pressure hole |
| 32 | plug |

I claim:

1. A method for measuring void fraction in a gas/liquid two-phase stratified flow system having at least one horizontal pipe portion, comprising the steps of:

mounting pressure-signal tubes filled with pressure transmitting medium to a top and bottom of a horizontal pipe portion of the flow system in order to output, respectively, gas side and liquid side pressure signals within the horizontal pipe portion;

measuring a pressure differential value from pressure-signals from the pressure signal tubes when flow within the horizontal pipe portion becomes a gas/liquid two-phase stratified flow;

deriving a height of liquid-phase flow level within the horizontal pipe portion from the pressure differential value; and deriving void fraction from a geometric relation between the height of liquid-phase flow level and a cross section of the horizontal pipe portion at a measuring point along the horizontal pipe portion.

2. The method for measuring void fraction as in claim 1, further comprising the step of:

correcting a density value of the liquid phase flow portion of the two-phase stratified flow to obtain a more accurate height of the liquid-phase flow level.

3. The method for measuring void fraction as in claim 2, wherein the step of correcting the density value of the liquid-phase flow is obtained from the average temperature of the liquid-phase measured at the measuring point.

4. The method for measuring void fraction as in claim 1, wherein the step of deriving the void fraction, α, in a circular pipe is performed according to the following equation:

$$\alpha = (2\pi - \theta + \sin\theta)/2\pi$$

where α is void fraction, θ represents a radial angle of the liquid-phase level and is equal to $2\cos^{-1}[(R-h)/R]$ wherein R represents an inner radius of a circular pipe portion and h represents a height of the liquid phase level and is equal to DP/ρ g, wherein DP is the pressure differential, ρ is an average mass density of the liquid phase of the two phase stratified flow, and g is the gravitational constant.

5. The method for measuring void fraction as claim 1, comprising filling the pressure-signal tubes with pressure transmitting medium that is same as the liquid flowing in the flow system.

6. The method for measuring void fraction as claim 1, comprising filling the pressure-signal tubes with pressure transmitting medium that is different from the liquid flowing in the flow system and is adapted for a two-phase thermal or boiling flow system at more than normal temperature/pressure states.

7. The method for measuring void fraction as claim 1, wherein the pressure differential value is measured when the two-phase stratified flow is at steady or transient state and under high temperature and high pressure conditions.

8. A measurement device for measuring void fraction in a horizontal pipeline portion of a gas/liquid two-phase stratified flow system, comprising:

two pressure-signal tubes mounted to a top and a bottom wall of the horizontal pipe portion at a selected measuring point such that first ends of the two pressure-signal tubes are opposite to each other, the pressure-signal tubes being filled with pressure transmitting medium for transmitting, respectively, a gas side and liquid side pressure signal;

means for providing a pressure differential signal output, the means having two input ends thereof connected to second ends of the pressure signal tubes by way of a linking tube forming a loop from one pressure signal tube through the pressure differential signal output means to the other one; and cooling means encasing the front end portions of the pressure signal tubes adjacent the top and bottom wall of the horizontal pipe portion for cooling the pressure signal tubes.

9. The measurement device as in claim 8, wherein the cooling means includes a cooling case encasing the front end portion of each pressure signal tube, a coolant inlet tube to conduct coolant into the cooling case from a coolant supply source for cooling the pressure signal tubes, and a coolant outlet tube for discharge of the used coolant away from the cooling case.

10. The measurement device as in claim 8, wherein the two pressure signal tubes are vertically mounted to the top and bottom walls of the horizontal pipe portion at the measuring point and extend in opposite directions, and a front end of the first end of each pressure-signal tube is flush with an inside surface of a corresponding one of the top and bottom walls.

11. The measurement device as in claim 8, wherein the two pressure signal tubes are horizontally mounted in parallel to a corresponding one of the top and bottom walls of the horizontal pipe portion at the measuring point and extend in one of a same direction or an opposite direction, and a front open end of each pressure-signal tube is connected to a vertical hole therein having one end open to the inside surface of the corresponding one of the top and bottom walls at the measuring point and the other end to the outer surface of the corresponding one of the top and bottom walls.

12. The measurement device as in claim 11, wherein the cooling means encase the front end portion of each pressure-signal tube adjacent the top and bottom walls of the horizontal pipe portion.

13. The measurement device as in claim 12, wherein the cooling means includes a cooling case encasing the front end portions of the pressure signal tubes, a coolant inlet tube to conduct coolant into the cooling case from a coolant supply source for cooling the pressure signal tubes, and a coolant outlet tube for discharge of used coolant away from the cooling case.

14. The measurement device as in claim 8, further comprising a temperature measuring means vertically mounted to the horizontal pipe portion at a location downstream from the measuring point to measure average temperature of a liquid phase of stratified flow in the flow system.

15. The measurement device as in claim 14, wherein the temperature measuring means includes a thermocouple-rake temperature probe.

16. A measurement device for measuring void fraction in a horizontal pipe portion of a gas/liquid two-phase stratified flow system, comprising:

a cylindrical body having an inside diameter equal to an inside diameter of the horizontal pipe portion and flanges at two ends thereof adapted to be connected to the horizontal pipe portion;

two pressure-signal tubes mounted to top and bottom walls of the cylindrical body at a selected measuring point such that first ends of the two pressure signal tubes are opposite to each other;

means for providing a pressure differential signal output, the means having two input ends thereof connected to second ends of the two pressure signal tubes by way of a linking tube forming a loop from one pressure signal tube through the pressure differential signal output means to the other pressure signal tube; and cooling means encasing front end portions of the pressure signal tubes adjacent the top and bottom wall of the cylindrical body for cooling the pressure signal tubes.

17. The measurement device as in claim 16, wherein the cooling means includes a cooling case encasing the front end portions of the pressure signal tubes, a coolant inlet tube to conduct coolant into the cooling case from a coolant supply source for cooling the pressure signal tubes, and a coolant outlet tube for discharge of used coolant away from the cooling case.

18. The measurement device as in claim 16, wherein the two pressure signal tubes are vertically mounted to the top and bottom walls of the cylindrical body at the measuring point and extend in opposite directions, and the front open end of each pressure-signal tube is flush with an inside surface of a corresponding one of the top wall and the bottom wall.

19. The measurement device as in claim 16, wherein the two pressure signal tubes are horizontally mounted in parallel to corresponding ones of the top wall and the bottom wall of the cylindrical body at the measuring point in one of the same or the opposite directions, and the front open end of each pressure-signal tube is connected to a vertical hole in the corresponding one of the top wall and the bottom wall, the vertical hole having one end open to an inside surface of the corresponding one of the top wall and the bottom wall at the measuring point and another end to extending to an outer surface of the corresponding one of the top wall and the bottom wall.

20. The measurement device as in claim 19, wherein the cooling means encases the front end portion of the pressure-signal tubes adjacent corresponding ones of the top wall and the bottom wall of the cylindrical body.

21. The measurement device as in claim 16, further comprising a temperature measuring means mounted to the cylindrical body at a location downstream from the measuring point to measure average temperature of a liquid phase of stratified flow of the flow system.

22. A pressure-based instrument for measuring one of pressure differential, pressure force, level, and flow in a flow system, comprising:

pressure-signal tubes that communicate signals of one of the pressure differential and pressure force; and cooling means encasing front end portions of the pressure-signal tubes adjacent mounting points on the flow system for cooling the pressure-signal tubes so as to prevent flashing phenomenon within the tubes.

* * * * *